United States Patent
Vadapandeshwara et al.

(10) Patent No.: US 9,684,490 B2
(45) Date of Patent: Jun. 20, 2017

(54) UNIFORM INTERFACE SPECIFICATION FOR INTERACTING WITH AND EXECUTING MODELS IN A VARIETY OF RUNTIME ENVIRONMENTS

(71) Applicant: ORACLE FINANCIAL SERVICES SOFTWARE LIMITED, Mumbai (IN)

(72) Inventors: Rajaram N. Vadapandeshwara, Bangalore (IN); Suresh B. Singh, Bangalore (IN); Renjith Ravindran, Bangalore (IN); Rekha Patil, Bangalore (IN); Nagesh Shetty, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 0 days.

(21) Appl. No.: 14/972,291

(22) Filed: Dec. 17, 2015

(65) Prior Publication Data
US 2017/0115964 A1   Apr. 27, 2017

Related U.S. Application Data

(60) Provisional application No. 62/246,657, filed on Oct. 27, 2015.

(51) Int. Cl.
G06F 9/44 (2006.01)
G06F 9/445 (2006.01)
G06F 17/30 (2006.01)

(52) U.S. Cl.
CPC .............. *G06F 8/30* (2013.01); *G06F 8/60* (2013.01); *G06F 17/30312* (2013.01)

(58) Field of Classification Search
None
See application file for complete search history.

(56) References Cited

U.S. PATENT DOCUMENTS 6,873,979 B2   3/2005 Fishman et al.
6,928,398 B1   8/2005 Fang et al.
(Continued)

FOREIGN PATENT DOCUMENTS

EP   1107157 A2   6/2001
EP   1146687 A2   10/2001

OTHER PUBLICATIONS

Patent Cooperation Treaty (PCT) International Search Report and Written Opinion in co-pending PCT International Appl. No. PCT/IB2016/000301 (International Filing Date of Jan. 28, 2016) having a date of mailing of May 25, 2016 (12 pgs.).

(Continued)

*Primary Examiner* — Daxin Wu
(74) *Attorney, Agent, or Firm* — Cooper Legal Group, LLC

(57) ABSTRACT

Systems, methods, and other embodiments associated with the generation and execution of analytical models are described. In one embodiment, a computer-implemented method includes identifying a selected runtime environment for executing an analytical model that includes analytical expressions. A user-script data structure is generated and provides mapping of the analytical expressions to executable expressions of the runtime environment. A computerized specification object is generated that includes a pre-script data structure, the user-script data structure with the analytical model, and a post-script data structure. The pre-script data structure specifies how the runtime environment is to access input data to be operated upon by the analytical model. The post-script data structure specifies how to output results data, produced by the analytical model, from the runtime environment. The computerized specification object is transmitted over a computer network to the runtime (Continued)

environment for execution of the analytical model in the runtime environment.

20 Claims, 5 Drawing Sheets

(56) References Cited

U.S. PATENT DOCUMENTS

| | | | |
|---|---|---|---|
| 7,079,993 | B2 | 7/2006 | Stephenson et al. |
| 7,881,535 | B1 | 2/2011 | McLaughlin et al. |
| 8,392,153 | B2 | 3/2013 | Pednault et al. |
| 8,417,715 | B1* | 4/2013 | Bruckhaus ........ G06F 17/30994 705/26.1 |
| 8,521,488 | B2 | 8/2013 | Kirby et al. |
| 8,762,193 | B2 | 6/2014 | Maga et al. |
| 2002/0169658 | A1* | 11/2002 | Adler ................. G06Q 10/06 705/7.28 |
| 2003/0023951 | A1 | 1/2003 | Rosenberg |
| 2006/0106626 | A1* | 5/2006 | Jeng .................. G06Q 10/06 717/106 |
| 2006/0195816 | A1* | 8/2006 | Grandcolas ......... G06Q 40/02 717/101 |
| 2006/0241923 | A1 | 10/2006 | Xu et al. |
| 2015/0293755 | A1* | 10/2015 | Robins ................ G06F 8/35 717/104 |
| 2016/0011905 | A1* | 1/2016 | Mishra ............... G06Q 10/06 718/102 |

OTHER PUBLICATIONS

Zubcoff J et al, "Integrating the Development of Data Mining and Data Warehouses via Model-driven Engineering", Actas de los Talleres de las Jornadas de Ingenieria del Software y Bases de Datos, Sistedes, 2008, vol. 2, No. 1, 2008, pp. 75-86.

Kosaku Kimura et al, "Runtime Composition for Extensible Big Data Processing Platforms", 2015 IEEE 8th International Conference on Cloud Computing, Jun. 27, 2015, pp. 1053-1057, XP055272472, DOI: 10.1109/Cloud.2015.151 ISBN: 978-1-4673-7287-9 figure 1 section II, "Models".

IBM: "IBM SPSS Modeler 15 User's Guide", 2012, XP055272523, Retrieved from the internet: http://faculty.smu.edu/tfomby/eco5385_eco6380/data/SPSS/SPSS%20Modeler%2015%20Users%20Guide.pdf [retrieved on May 13, 2016], last paragraph of p. 17, pp. 1-2, sections titled "IBM SPSS Modeler" and "IBM SPSS Modeler Server".

Fethi A Rabhi et al, "ADAGE: a framework for supporting user-driven ad-hoc data analysis processes", Computing: Archives for Scientific Computing, Springer-Verlag, VI, vol. 94, No. 6, Mar. 30, 2012, pp 489-519, XP035066562, ISSN: 1436-5057, DOI: 10.1007/S00607-012-0193-0 Figures 6-8 pp. 498-499.

The Mathworks, Inc., "Financial Toolbox", 2013, pp. 1-12; downloaded from: http://in.mathworks.com/products/datasheets/pdf/financial-toolbox.pdf.

John Spooner, "Creating a SAS Model Factory Using In-Database Analytics", from SAS Global Forum 2011, Data Mining and Text Analytics; Paper 147-2011; pp. 1-8; downloaded from: https://support.sas.com/resources/papers/proceedings/11/147-2011.pdf.

* cited by examiner

UNIFORM INTERFACE SPECIFICATION FOR INTERACTING WITH AND EXECUTING MODELS IN A VARIETY OF RUNTIME ENVIRONMENTS

CROSS REFERENCE TO RELATED APPLICATIONS

This disclosure claims the benefit of U.S. Provisional Patent Application Ser. No. "62/246,657" filed Oct. 27, 2015, titled "Systems and Methods for Providing a Uniform Interface Specification to Allow a Single-Definition Analytical Model to be Plugged Into and Executed in a Variety of Runtime Environments", inventors: Vadapandeshwara, et al., and assigned to the present assignee, wherein the provisional patent application is hereby incorporated by reference in its entirety.

BACKGROUND

Today, a business analyst working for a company may develop a statistical model that is used to help understand some aspect of the business. The model includes computational expressions that have to be executed by a computing system that runs a specialized application for such models. In some cases, the model may be very complex and the company may typically use an outside vendor (a quantitative analysis provider) to execute the model. The outside vendor provides a runtime environment in which to execute the model by way of custom software. However, the runtime environment is configured to execute computational expressions that are specific to the runtime environment. Thus any input to the runtime environment must be in a specific computer language/format that is recognized by the runtime environment. For example, if the outside vendor is MATLAB runtime environment, then the statistical model submitted for execution must be created and formatted using MATLAB runtime environment computational expressions such that the model can be executed in the MATLAB runtime environment. Likewise, if a different vendor is used to execute a statistical model, then the statistical model must be created and formatted using the computational expressions of that vendor. Otherwise, the statistical model is an invalid input and will not execute in the runtime environment of that vendor.

A business analyst may not be trained with respect to any particular runtime environment, however. To simplify the programming process, the business analyst may initially create a statistical model using, for example, the English language, pseudo-code, or flowcharts. The business analyst may then work with a software programmer that is trained with respect to a particular runtime environment and its particular programming language. The software programmer then creates a program of the model that complies with and uses computational expressions of the runtime environment.

At a later date, if the business analyst or the company decides that a new outside vendor should be used to execute statistical models, then the existing statistical models of the company will not function. That is because the new outside vendor most likely provides a different runtime environment (e.g., Python runtime environment) that requires a different language and executes models that require different computational expressions. Therefore, the existing statistical models will have to be re-programmed to conform to the computational expressions of the different runtime environment. The business analyst may have to work with the same software programmer, or a different software programmer, to create new programs of the existing models that use computational expressions of the new runtime environment.

A company may have many statistical models that have to be reprogrammed upon switching to a new outside vendor. The process of reprogramming the existing models is time consuming and costly. Reprogramming also consumes many resources (business analysts, software programmers, etc.). Furthermore, the reprogramming process will have to be repeated every time the company switches to a new outside vendor.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
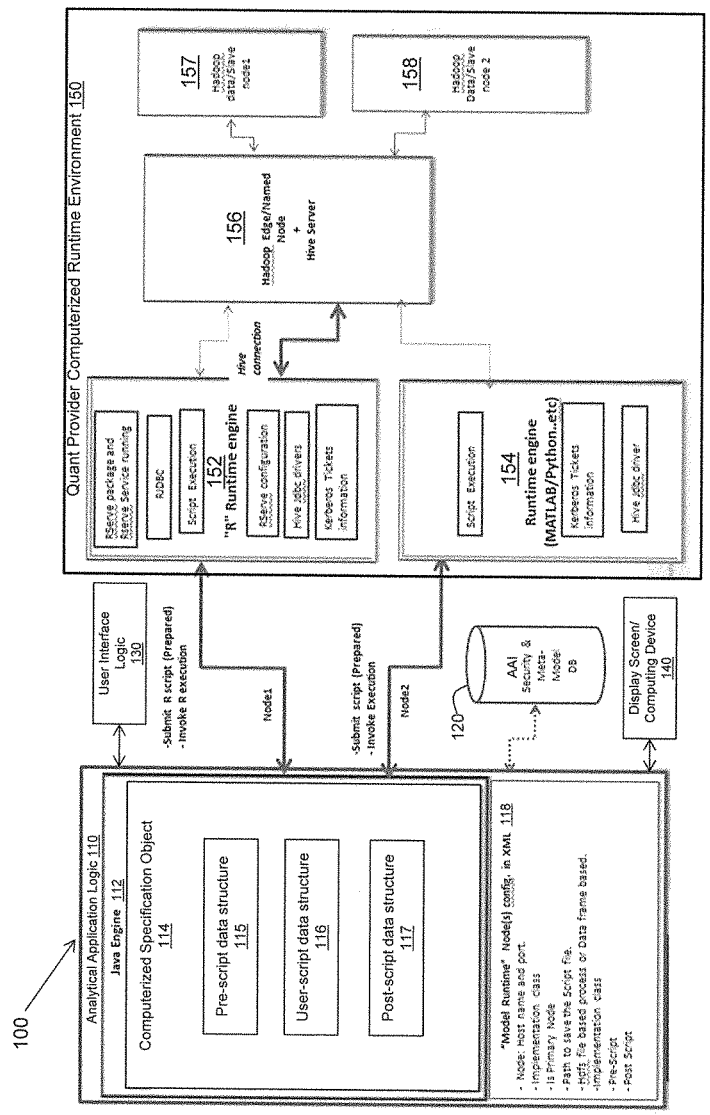
FIG. 1 illustrates one embodiment of a system having an analytical application infrastructure (AAI) which is configured to allow an analytical model to be defined such that the analytical model can be executed in any of a number of different quantitative analysis provider runtime environments.

Computerized systems and methods are described herein that are configured to allow a user (e.g., a business analyst) to create statistical models (or other types of analytical models). An interface is implemented that allows an analytical model to be executed in multiple different types of runtime environments (e.g., MATLAB runtime environment, Python runtime environment, R runtime environment, etc.) without having to re-generate or re-configure the analytical model for a specific runtime environment that is selected for executing the model.

The term "analytical model" is used herein generically and may refer to a mathematical model, a business model, a statistical model, an algorithmic model, or any combination thereof that is configured to be readable by and input to a computing system. For example, an analytical model may be defined using a series of statements (e.g., analytical expressions) in a document such as an extensible markup language (XML) file.

The terms "computerized runtime environment", "runtime environment", "execution environment", "statistical runtime", "quantitative analysis runtime", and "provider runtime" are used interchangeably herein and refer to a computerized computational system (e.g., a web service system) provided by a quantitative analysis provider.

The term "quantitative analysis provider" or "runtime provider", as used herein, refers to the vendor that provides the computerized runtime environment for executing an analytical model.

The terms "specification" and "computerized specification object" may be used interchangeably herein.

The terms "analytical application infrastructure" and "analytical application logic" are used interchangeably herein.

The term "push" and its various forms, as used herein, refers to sending (e.g., transmitting) data to another program or computer without the other program or computer having requested the data.

The term "pull" and its various forms, as used herein, refers to requesting data from another program or computer and receiving the data.

GENERAL OVERVIEW

In one embodiment, an analytical application infrastructure (AAI) is provided. The AAI is also sometimes referred to herein as analytical application logic. The AAI enables execution of scripted models to be executed on one or more nodes of a computerized runtime environment (e.g., a remote server computer system). By configuring the AAI with a run time parameter, model execution can be performed on any node, or the model can be distributed for execution on multiple nodes. In accordance with one embodiment, as part of the AAI, an interface and plugin driver are provided to allow statistical models to be plugged into a runtime environment, and to declaratively configure processing nodes for the same.

The AAI provides an interface specification and plugin module to allow for any statistical runtime environment to be used for executing an analytical model. As an example, an analytical model can be defined irrespective of an encoding format or syntax that is specific for executing the analytical model in a particular runtime environment (e.g., MATLAB runtime environment, Scala runtime environment, M-Lib runtime environment, etc.). Different runtime environments require different encoding formats for the input analytical model. Thus, if an analytical model is defined in a format that is different from a format that is expected by a runtime environment, then the analytical model will not be recognized by the runtime environment and cannot be executed (e.g., incompatible format). The AAI allows for an analytical model, in one format, to be submitted and executed in any of various runtime environments regardless of format. Additionally in one embodiment, the AAI provides functionality to provide instructions to a runtime environment that declaratively direct the processing of the analytical model to particular hardware infrastructure (e.g., local nodes, remote nodes, a Hadoop cluster) of the runtime environment.

In one embodiment, the AAI generates an execution model or specification that includes a "pre-script" block, a "user-script" block, and a "post-script" block. The specification is generated and maintained as a computerized object (i.e., a computerized specification object), in accordance with one embodiment. From one perspective, the three components together (pre-script block, user-script block, post-script block) create an executable artifact that can be declaratively associated to a designated runtime environment of a particular quantitative analysis provider and additionally can be targeted to run on local or remote nodes, or on a Hadoop cluster. In one embodiment, the pre- and post-script plugins are well specified. The pre-script and the post-script may be implemented by the quantitative analysis provider (runtime environment—host server side) or by a provider of the analytical application logic (client side).

In accordance with one embodiment, the AAI includes the following distinct parts in a computerized specification object (specification):

- an initiation block that establishes credentials for the modeler to own, work with data, and execute the model.
- a pre-script block that binds model variables to data handles, prepares the workspace for models, prepares provider specific syntactic structures to query for data, and prepares input/output data structures.
- a core business logic represented at least in part by a statistical model (model definition) of quantitative analysis techniques in a user script block along with bindings to variable/static parameters and place-holders. The core business logic automatically determines the runtime environment to bind against based on meta-information associated with the user-script block. For example, the meta-information identifies a particular runtime environment that has been selected (from a group of runtime environments) for executing the statistical model. Therefore changing the meta-information associated with the user-script block switches the runtime environment (and thus the provider) without change to the model definition (i.e., the analytical/statistical model).
- a post processing block (post-script block) that prepares an output of the execution for downstream consumption.
- a configuration block that holds information indicating what hardware to use within a selected runtime environment to run the model (e.g., local nodes, remote nodes, a cluster of nodes) and other environmental parameters.

Much of the description herein is provided with respect to referring to a statistical model. However, other types of analytical models are possible as well. A system is configured that is able to access, for example, MATLAB runtime environment and Python-based runtime environments and have statistical models execute against both of them. The statistical model is a single definition model. Typically today, if an algorithm is being developed against MATLAB runtime environment, MATLAB-specific code is written. Similarly, if an algorithm is being developed against Python runtime environment, Python-specific code is written. In one embodiment, one specification (script, not code) of a statistical model (single definition model) is able to be defined that can bind with and run with the underlying MATLAB runtime environment, Python runtime environment, or other runtime environment without the model being coded in the specific code of the runtime environment.

The functions that a statistical model performs can be specified in a runtime-agnostic manner (i.e., via a script). Typically a statistical model has a set of independent variables (input data) and a set of dependent variables (results data). For example, a dependent variable may be the probability of a certain segment of the population defaulting on their home loan. The independent variables might be gross domestic product (GDP), unemployment rate, inflation rate, and historical average of balances on home loans. The model may operate on these four (4) independent variables to calculate or determine the probability of default. The four (4) independent variables may be subjected to various analytical algorithms as defined by the model (e.g., maybe a linear regression algorithm or some other statistical algorithm that is run in a number of steps to finally determine the end result, which is the probability of default).

In one embodiment, a declarative specification (a computerized specification object) is generated that is based on a declarative paradigm (e.g., spoken English). In the computerized specification object, variables are selected, the type of computations these variables will be subjected to is declared, and the type of output result is defined. This declarative specification is then stored, for example, in an XML format. The specification can then be sent to an underlying quantitative analysis provider (e.g. MATLAB runtime environment or Python runtime environment) such that three separate distinct sets of instructions from the specification are input into the runtime environment of the quantitative analysis provider.

In one embodiment, the first set of instructions is a pre-script which instructs the quantitative analysis provider runtime environment to connect to a particular database and map certain tables and columns to the variables that are being sent. The second set of instructions is the user-script which is the algorithm or statistical model which queries the quantitative analysis provider to provide the expression(s) to compute, for example, a linear regression or some other mathematical function(s). Based on what the runtime environment provides, the four (4) independent variables, from the above example, that were queried and defined in the pre-script, are input into that expression. The third set of instructions is a post-script where the runtime environment is directed, after having computed the output results, to store the output results in a placeholder that was sent as the dependent variable place holder. The approach of having a pre-script, a main user-script, and a post-script is uniform with respect to the underlying runtime environment (quantitative analysis engine) of a quantitative analysis provider. That is, the same specification structure having a same analytical model defined in a user-script (single-definition) can be used with any underlying runtime environment without having to re-write the analytical model or deviate from the specification structure (pre-script, user-script, post-script).

In one embodiment, the runtime environment of the quantitative analysis provider (e.g., MATLAB runtime environment or Python runtime environment) does not have to be programmed to recognize specifics of the analytical application infrastructure (AAI) or any specific interface information. The scripts guarantee that the model will work in the runtime environment. Customers do not want to be restricted into having to rely on one quantitative analysis provider to execute their statistical models. The mechanisms described herein allow the customer to move from one runtime environment to another without having to reprogram existing statistical models into a new language with new expressions that are specific to a runtime environment. With the present system and method, the statistical models defined in the AAI environment can be inputted for execution with different runtime environments.

FIG. 1 illustrates one embodiment of a computerized system 100 having an analytical application infrastructure or logic 110. The analytical application logic 110 is configured to allow an analytical (e.g., statistical) model to be defined and be deployed/submitted for execution in any of a number of different runtime environments without having to reprogram/rewrite the statistical model to comply with specific requirements of a selected runtime environment. The analytical application logic 110 includes a Java engine 112, which supports generation of a computerized specification object 114 (specification). The computerized specification object 114 includes a pre-script 115, a user-script 116, and a post-script 117. The computerized specification object 114 may also include a computerized initiation object and a computerized configuration object, as discussed later herein.

The computerized system 100 also includes a database device 120 operably connected to analytical application logic 110 directly and/or via a network interface to allow access to the database device 120 via a network connection. In accordance with one embodiment, the database device 120 is configured to store and manage computerized objects and data structures (e.g., records of independent variable data and output results data for a statistical model) associated with analytical application logic 110 in a database system (e.g., an analytical application database system).

The computerized system 100 also includes user interface logic 130 operably connected to analytical application logic 110. In one embodiment, user interface logic 130 is configured to generate a graphical user interface (GUI) to facilitate user interaction with analytical application logic 110. For example, user interface logic 130 includes program code that generates and causes the graphical user interface to be displayed based on an implemented graphical design of the interface. In response to user actions and selections via the GUI, associated aspects of scripts and model definitions may be manipulated.

The computerized system 100 also includes a display screen 140 operably connected to analytical application logic 110. In accordance with one embodiment, the display screen 140 is implemented to display views of and facilitate user interaction with a graphical user interface (GUI) generated by user interface logic 130 for viewing and updating information associated with single definition analytical modeling. In one embodiment, analytical application logic 110 is a centralized server-side application that is accessed by many client devices/users. Thus the display screen 140 may represent multiple computing devices/terminals that allow users to access and receive services from analytical application logic 110 via networked computer communications.

Furthermore, user interface logic 130 is configured with an input parameter for selecting one runtime environment from a list of available runtime environments, which is selectable by a user. The input parameter identifies a runtime environment to which a selected analytical model will be deployed for execution. In one embodiment, the selected runtime environment is stored as meta-information. In the following discussion, the selected runtime environment will be referred to as computerized runtime environment 150 (see FIG. 1) that is hosted by a quantitative analysis provider on a remote computer system.

The user interface logic 130 is also configured to facilitate outputting and displaying of results data via the graphical user interface on the display screen 140. Results data is data generated by and received from the computerized runtime environment 150 after executing the selected analytical model that was submitted for execution. Further discussion of the computerized runtime environment 150 follows later herein. Other types of results data are possible as well, in accordance with various other embodiments.

Other embodiments may provide different logics or combinations of logics that provide the same or similar functionality as analytical application logic 110 of FIG. 1. In one embodiment, analytical application logic 110 is an executable application including algorithms and/or program modules configured to perform the functions of the logic when executed by a processor. The application is stored in a non-transitory computer storage medium. In one embodiment, functions of analytical application logic 110 are implemented as modules stored on a non-transitory computer-readable medium where the modules include instructions executable by at least a processor to perform the functions described herein. Collectively, analytical application logic 110, database device 120, user interface logic 130, display screen 140, and the operable connections therebetween are referred to herein as the analytical application environment.

In one embodiment, FIG. 1 shows blocks that describe components that are generated and included into a specification (a computerized specification object) by the analytical application logic 110. The specification is generated to include a pre-script 115, a user-script 116, and a post-script 117 in the form of data structures. The user-script 116 is generated to include the actual quantitative analysis block (statistical model for execution is added to the user-script data structure). FIG. 1 shows how the pre-script 115, user-script 116, and post-script 117 are input to a computerized runtime environment 150 of a quantitative analysis provider. In FIG. 1, R runtime environment is used as the quantitative analysis engine (also shown with MATLAB runtime environment, Python runtime environment, etc. as alternative quantitative analysis engines). The basic concept can work with a traditional setup or can be implemented using a clustered Hadoop architecture. The script does not have to contain information about the underlying hardware specification or how the script will be run by the quantitative analysis provider.

The quantitative analysis provider is the entity (e.g., vendor with a host server) that provides the runtime environment for executing statistical models. The analytical application logic provider is the entity (e.g., client) that uses the analytical application logic 110 to submit one or more statistical models for execution on a runtime environment. Recall that there are multiple different runtime environments available for selection, each of which can execute statistical models in a particular format. The specification (pre-script, user-script, post-script) instructs the selected runtime environment as to what is to be implemented. For example, a runtime environment can implement the pre-script and post-script directly (e.g., generated and implemented on the host server). Alternatively, the quantitative analysis provider can publish a specification of the runtime environment that describes syntax, format, etc., of functions of the runtime environment (e.g., describes what functions are internally called in order to connect to, for example, a database to perform a query). By obtaining the specifications from multiple different runtime environments, a database of runtime specifications may be generated in a data structure form and organized by each identified runtime environment. A runtime specification may be used to generate translation instructions for the user-script 116, as will be described later. Then the analytical application logic 110 is configured to generate and implement the pre-script and the post-script according to the runtime specification of a selected runtime environment. Both approaches are feasible.

Therefore, if the quantitative analysis provider wants clients to implement the pre-script and post-script, the quantitative analysis provider would have to share, with the clients, runtime specifications and syntax including how to connect to a database to perform a query within the runtime environment. Then, a client that operates the analytical application logic 110 can implement the pre-script and post-script, given the specifications from the quantitative analysis provider. Alternatively, the quantitative analysis provider can implement the pre-script and post-script internally for a runtime environment for operating with a particular client, for example, if the quantitative analysis provider does not want to reveal the runtime specifications to clients.

One embodiment provides for the configuring of the specification (pre-script, user-script, post-script) and the ability to input the specification to a designated runtime environment of a quantitative analysis provider and initiate execution. The script-based specification is a neutral approach to specifying a model such that the model can work with any runtime environment. That is, the same model is executable in different runtime environments even though each runtime environment requires different expressions for a model. Often times, the underlying statistical code (e.g., for MATLAB runtime environment, etc.) is proprietary. But the user of the AAI does not have to be knowledgeable of or understand the proprietary code in order to make use of the runtime environment to execute the statistical models that have been developed. The user statistical model is a business-level model that stays intact, no matter where the statistical model is inputted for execution (MATLAB runtime environment, Python runtime environment, R runtime environment, etc.). The specification (pre-script, user-script, post-script) is essentially a user interface specification. In one embodiment, the pre-script and the post-script are reconfigured to be particular to a particular runtime environment. For example, based on how the runtime environment connects to a database and queries the database, the scripts include commands or code according to a protocol of the runtime environment. Thus the scripts provide the interface to allow the statistical model to be executable in the runtime environment.

The pre-script is the block generated by the analytical application logic 110 that instructs the computerized runtime environment 150 as to how to get/read data (e.g., the input variable data) that is used by expressions in the analytical model. In one embodiment, the data resides in an analytical application infrastructure database device 120. That is, how the data gets extracted out of the database device 120 and provided to the computerized runtime environment 150 is defined in the pre-script block. For example, in one embodiment, the pre-script data structure 115 specifies how the computerized runtime environment is to connect to the database device 120 to access the independent variable data.

The pre-script accesses the data and organizes the data into a format such that the external runtime environment can correctly read and recognize the data that is inputted as part of the analytical model. For example, one runtime environment may be configured to read data as a list of values. Thus if the input data is not formatted as a list of values, the input data will not be read correctly. Another runtime environment may be configured to read the data in a table format. A third runtime environment may read the data in a specific format such as, for example, an Excel format. That is, each quantitative analysis provider may treat the data in a different manner that suits their runtime environment. Therefore, the pre-script is constructed or configured accordingly for the runtime environment of a particular quantitative analysis provider. The pre-script allows connection to the data environment, allows the data be extracted out, and massages the data in such a way that the runtime environment can properly observe the data.

The user-script is a main part of the specification object 114. The user-script specifies the analytical (e.g., statistical) model that computes, for example, a probability of defaulting on a loan for a group of customers based on four (4) independent variables using linear regression, among other statistical and mathematical methods. That is, the user-script specifies the series of computational (e.g., statistical) steps or operations (as analytical expressions) to be performed on the independent variable data. The quantitative analysis provider provides the actual statistical and mathematical functions (executable expressions) that will operate on the data and compute the result in the runtime environment 150. The input data is made available by the pre-script. In one embodiment, the user-script includes instructions for mapping the analytical expressions that make up the analytical model to corresponding executable expressions of the computerized runtime environment. Thus the user-script provides a mechanism for allowing the runtime environment to execute the analytical model that is input, even though the analytical model itself has an unrecognizable/incompatible format.

For example, suppose there is one way in which a linear regression function will input and operate on three (3) variables. Therefore, once the input data is processed through the pre-script methodology (accessed, massaged, etc.), the data is bound to the underlying algorithm through well-known mathematical principles, and the algorithms are called in the sequence instructed in the user-script. Therefore, the runtime environment, during execution, cannot alter the underlying mathematical basis for how an algorithm is instantiated and how the data is presented to the placeholders in the algorithm.

For example, a linear regression algorithm may be configured to input three (3) variables separated by commas in parentheses. Such a mathematical format cannot be changed. Even though the data may be presented to a runtime environment as a list of values for a linear regression algorithm, the name or expression of the algorithm also has to be recognized and identifiable by the runtime environment. For example, the MATLAB runtime environment may call the algorithm "linear regression", the Python runtime environment might call the algorithm "LREG", and a third quantitative analysis provider runtime environment may call the algorithm "LR". The names, formats, and other rules of a runtime environment can be regarded as a syntax of the runtime environment that is defined by a runtime specification. As previously mentioned, a database of runtime specifications (in data structure form) can be generated from a variety of available runtime environments.

Therefore, in one embodiment, in response to a selected runtime environment, a corresponding runtime specification is analyzed from the database and the user-script is generated to include expressions that are specific/compatible with the syntax of the selected runtime environment. Therefore, in one embodiment to make an analytical model developed in the analytical application environment compatible with a different runtime environment, the user script includes statements that re-map the names of the steps in the analytical model to the names and syntax used by the runtime environment for corresponding steps/actions based on the runtime specifications. Thus in one embodiment, the user script is configured to translate the statements of the analytical model (that has no specific format or syntax) to statements that comply with the syntax of a selected runtime environment.

In one embodiment, a runtime specification from a quantitative analysis provider may include information or data for how to take an output result and read the output result back from the algorithm. Such information or data can be used in the post-script to define the outputting of data. For example, if the output is a probability of default for a group of customers that will default on a home loan, the runtime environment may return the value in a number of different ways (e.g., numerically, as a string, as some binary value that has to be decoded back to a numeric format). The post-script is configured accordingly such that results can be written back or output back to the analytical application environment (e.g., to the database device 120). Thus, knowledge of the runtime specification of how to read back the output from the runtime environment is used to configure the post-script correctly. Therefore, again, the post-script can be tailored to a particular runtime environment. For example, in one embodiment, the post-script data structure 117 specifies how the computerized runtime environment is to connect to the database device 120 to store results data.

Writing the output result back to the analytical application environment is based on how the analytical application environment (the client/customer system) is configured. However in one embodiment, post-script expressions can be transmitted from the client system to the runtime environment to be implemented within the runtime environment. In this manner, the runtime environment can be configured to operate with requirements of the client system for outputting execution results.

When a customer wants to change from one quantitative analysis provider to another, thereby changing the runtime environment, the pre-script and the post-script blocks are generated to be compatible with the new runtime environment. The user-script is also generated to re-map the expression names of the steps or call functions used in the model to the names/syntax of the corresponding algorithm (e.g., linear regression, correlation, etc.) of the new runtime environment to be compatible with the new runtime environment. In one embodiment, as previously stated, the runtime specification of the new runtime environment is retrieved from a database and used to determine appropriate translation and mapping instructions. Therefore, for the user-script, a mapping is performed that translates statements in the model to corresponding statements and syntax of the runtime environment. The analytical application environment names are taken and are mapped to the runtime environment names. Therefore, when a customer changes quantitative analysis providers, a new mapping is performed and generated for the user-script based on the syntax of the new runtime environment. The business analyst does not see this mapping. Therefore, to the business analyst, the statistical model (as defined in the user-script) has not changed and does not have to be reprogrammed by the business analyst.

In one embodiment, there is an initiation block (e.g., a computerized initiation object), which is part of the computerized specification object 114, that provides a set of steps that occur in the analytical application environment prior to initiating the actual execution. In another embodiment, the initiation block may be a computerized initiation object that is separate from the computerized specification object.

The initiation block defines which tables, columns, etc. supply the actual data. Some quantitative analysis providers write the output results back as a file. They never read and write to the database device 120. Therefore, if the quantitative analysis provider provides that file to the analytical application environment, the analytical application environment determines what data structures are to be prepared up front such that there are write permissions for the quantitative analysis provider to write back to the file.

The initiation block is, in some sense, executed once depending on the underlying runtime environment. Today execution may take place on a Linux box, tomorrow execution may take place on a cluster, and the next day execution may take place in a large UNIX IBM mainframe environment. Therefore, depending on the underlying deployment environment, the initiation block gets executed once at the start of the analytical application infrastructure process.

The configuration block (e.g., a computerized configuration object) is used to synchronize one or more of the system elements to a set of parameters. The set of parameters may include, for example, parameters related to the location of remote files (Remote_File_Location), the identification of edge nodes (Edge_Node_Identifier), hive sessions (Hive_Session_Parameters), and the identification of functions (Function_ID). Also, the configuration block may define where the model is being run (local nodes, remote nodes, on a cluster) in the computerized runtime environment. Therefore, in one embodiment, host names are shared within the system such that the system is instructed to and/or can identify where functions are executing, where data gets handed off, where results are returned, which folder to access, etc. These parameters and/or instructions are set up and defined in the configuration block. The computerized configuration object may be part of the computerized specification object or may be a totally separate object, in accordance with various embodiments.

System Execution Flow

Referring again to FIG. 1, the left side of FIG. 1 shows one embodiment of the analytical application environment which includes the analytical application logic 110. There is also the database device 120 which includes a meta model database where objects defined with the analytical application logic 110 get stored. FIG. 1 shows a dotted connection to the meta-model database 120, which is a depository that holds all of the defined objects. Even the model definition is an object that gets deposited into the meta-model database 120.

The application tier of the AAI is the Java Engine 112, in accordance with one embodiment. The key framework in the application tier is the modeling framework where the statistical models are built (e.g., by human business analysts). The core modeling framework is where a business user (a human business analyst) declaratively defines the intent of the model which results in a computerized specification object 114 (specification) having at least a pre-script, a user-script, and a post-script.

In one embodiment, the computerized specification object 114 is represented as an XML file. The contents of the XML file is, for example, spoken English in some sense such that anyone literate in the English language can look at the XML file and understand what the model definition means. Therefore, the specification (pre-script, user-script, post-script) is a translation of a notation that was traditionally written in the awkward and cryptic language of statistical programming, into a notation that a business person can understand. This is represented in FIG. 1 as the "Model Runtime" Node(s) config. in XML file 118. The XML file 118 represents the intent plus everything else that finally goes into executing the model (e.g., the specification, the initiation block, and the configuration block). The XML file 118 becomes a single reference point to understanding the model and the executing dynamics of that model.

FIG. 1 also shows a representation of that same model definition being input to a node where the computerized runtime environment 150 performs execution of the model by first taking the model definition and binding the model definition to the actual implementation (e.g., R-based runtime engine 152 or MATLAB-based or Python-based runtime engine 154). Then the physical aspect of the execution can be input to a Hadoop node (e.g., a cluster of commodity hardware). These various executable hardware system nodes are determined by the quantitative analysis provider for various reasons/preferences. FIG. 1 shows an execution environment that is configured to run in a Hadoop environment. The Hadoop environment has a single main node 156 and a couple of worker slave nodes 157 and 158 where the analytical model is actually executed, clock cycle by clock cycle.

Figure 2:
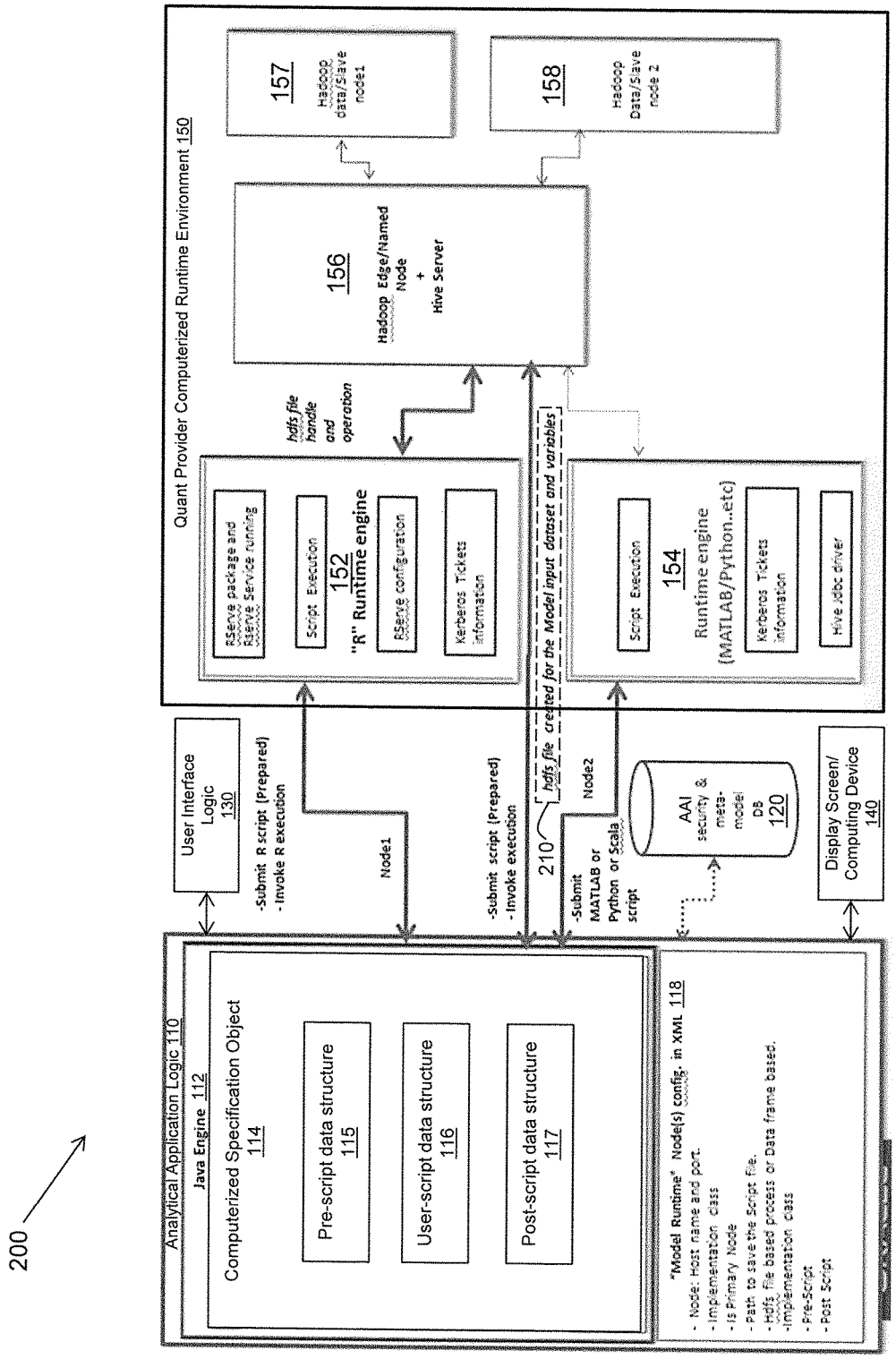
FIG. 2 illustrates another embodiment of a system having an analytical application infrastructure (AAI) which is configured to allow an analytical model to be defined such that the analytical model can be executed in any of a number of different quantitative analysis provider runtime environments.

Referring to FIG. 2, the system 200 of FIG. 2 is similar to the system 100 of FIG. 1, except the system 200 of FIG. 2 uses a file-based representation of data. In FIG. 1, there is no representation of such a file. In FIG. 2, there is a block 210 labeled "hdfs file created for the Model input dataset and variables". An hdfs file is a Hadoop Distributed File System file. The system 200 shows that the data used for the model's execution can be shared either by allowing the quantitative analysis provider runtime environment to connect to the AAI data repository (database) 120, or by providing a file-based representation (block 210) of the data such that a quantitative analysis provider runtime environment does not have to connect to the AAI data repository 120. To that extent, the quantitative analysis provider runtime environment can be completely agnostic to the existence of the analytical application logic 110 in any form or manner. The hdfs file of block 210 becomes the conduit for getting data to the quantitative analysis provider execution environment 150 and getting result data back.

Figure 3:
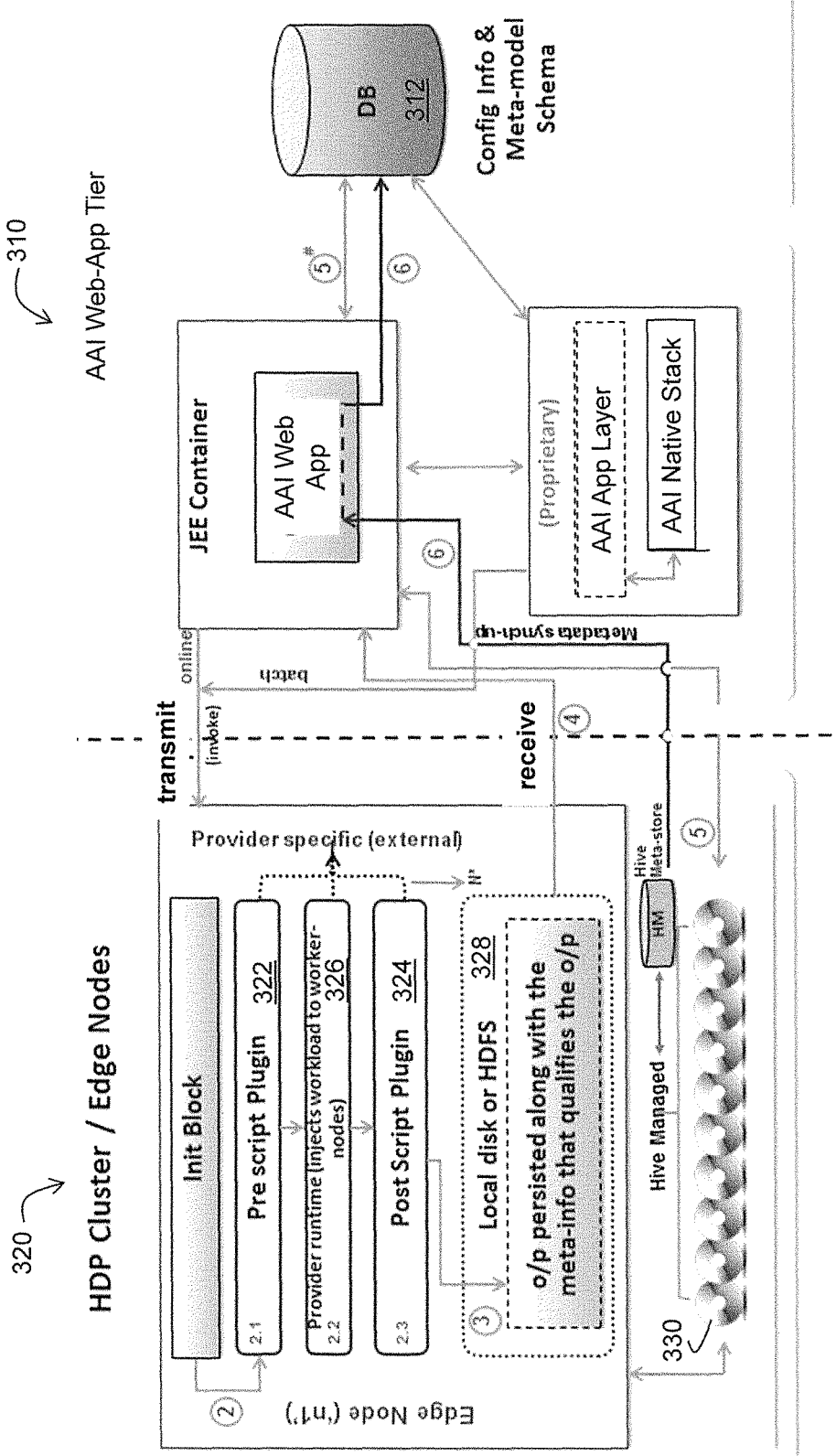
FIG. 3 illustrates one embodiment of a deployment architecture which shows how the system of FIG. 1 appears from a deployment perspective.

FIG. 3 illustrates one embodiment of a deployment architecture which shows how the system 100 of FIG. 1 appears from a deployment perspective. The analytical application environment 310 is on the right side of FIG. 3 and the quantitative analysis provider environment 320 is on the left side of FIG. 3. As shown in FIG. 3, the pre-script 322 and the post-script 324 parts of the specification have been transmitted (pushed) from the analytical application environment 310 to the quantitative analysis provider environment 320 as plugins, and the statistical model has been input to (pushed to) the quantitative analysis provider environment from the analytical application environment.

The pushing process shown in FIG. 3 is how execution is initiated, in accordance with one embodiment. Block 326 of FIG. 3 is where the provider runtime environment 320 executes the analytical model and can be spread out over a number of nodes depending on the complexity of the analytical model and the amount of data to be processed. The post-script 324 is configured to write back to a disk or an hdfs file 328. The file is read back via a receiving (pulling) process and is posted to the AAI database device 312 which is shown on the right in FIG. 3. The pulling process is a network communication process that includes transmitting a request for data to another computer and, after the computer responds with output results, receiving the output results from the computer. The Hive Managed section 330 on the bottom left in FIG. 3 shows the distributed parts of the cluster that are performing the different executable tasks.

Figure 4:
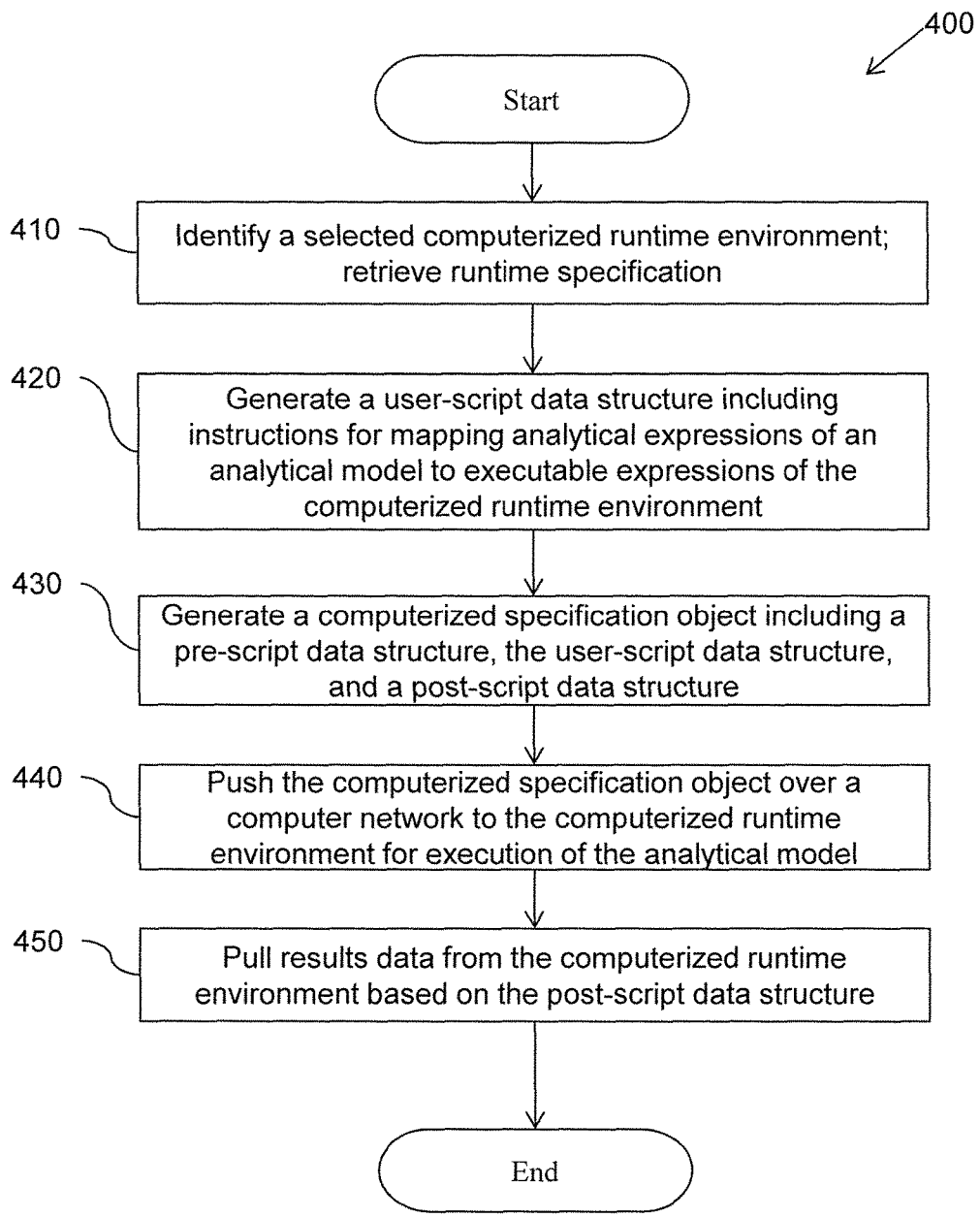
FIG. 4 illustrates one embodiment of a method, which can be performed by the analytical application infrastructure (AAI) of FIG. 1.

FIG. 4 illustrates one embodiment of a method 400, which can be performed by the analytical application logic 110 of FIG. 1. Method 400 describes operations of the analytical application logic 110 and is implemented to be performed by the analytical application logic 110 of FIG. 1, or by a computing device configured with an algorithm of the method 400. For example, in one embodiment, method 400 is implemented by a computing device configured to execute a computer application. The computer application is configured to process data in electronic form and includes stored executable instructions that perform the functions of method 400.

Method 400 will be described from the perspective of FIG. 1, where the analytical application logic 110 is part of the computerized system 100 that provides a user interface and translation mechanism for submitting an analytical model to a selected runtime environment from a group of available runtime environments. Again, an analytical model can be described as a mathematical model, a business model, a statistical model, an algorithmic model, or any combination thereof. For example, an analytical model may be defined using a series of statements (e.g., analytical expressions) in a computerized document such as an extensible markup language (XML) file. An analytical model is generated by, for example, a business analyst using analytical expressions that are uniform in the analytical application environment. The method 400 allows a business analyst or other operator to select a runtime environment from a group of available runtime environments for executing an analytical model. Thus, the method 400 provides a mechanism to easily switch from one runtime environment to a different runtime environment, to actually execute the analytical model, without having to modify or reprogram the analytical model.

Upon initiating method 400 to begin the process of submitting an analytical model for execution, at block 410, an input parameter is read from the user interface that identifies a selected runtime environment. In one embodiment, the identified runtime environment is stored as meta-information. In one embodiment, a list/group of available runtime environments may be displayed to allow a user to make a selection. A runtime specification for the selected runtime environment is then retrieved from a database as previously described. The runtime specification defines at least syntax and functions/statements of the associated runtime environment and this data is used for generating appropriate instructions for the user-script. Block 410 may also include identifying the analytical model from a group of existing analytical models that is to be submitted for execution. The model may be identified from a user input via the user interface, and then the method includes retrieving the model from a database or other storage location that stores the identified model. As previously explained, the analytical model includes analytical expressions that are defined using a format that is not compatible with the runtime environment.

At block 420, a user-script data structure is generated. The retrieved runtime specification is used to generate instructions for mapping statements of the analytical model to equivalent/corresponding statements of the runtime environment. For example, the user-script data structure includes instructions for mapping the analytical expressions of the analytical model to executable expressions of the computerized runtime environment based on the meta-information. The executable expressions may include multiple computational steps to be executed in sequence by the computerized runtime environment, in accordance with one embodiment.

In one embodiment, the user-script data structure specifies a sequence of analytical steps of the analytical model to be performed by the computerized runtime environment on input data. The instructions of the user-script data structure are used by the runtime environment to properly read and execute the analytical model even though the analytical model is defined in a format unrecognized by the runtime environment. In one embodiment, the selected analytical model to be executed is added to/included with the user-script data structure.

At block 430, a computerized specification object is generated. The computerized specification object includes the user-script data structure and the analytical model to be executed, a pre-script data structure, and a post-script data structure as previously described. The post-script data structure specifies how to output results data produced by the analytical model from the computerized runtime environment. The pre-script data structure specifies how the computerized runtime environment is to access input data (e.g., independent variable data) to be operated upon by the analytical model.

For example, the pre-script data structure may specify how the computerized runtime environment is to connect to a database device to access input data to be operated upon by the analytical model. Alternatively, the pre-script data structure may specify how input data to be operated upon by the analytical model is to be read by the computerized runtime environment from a data file.

At block 440, the computerized specification object (which includes the analytical model) is pushed over a computer network to the selected computerized runtime environment for execution of the analytical model by the computerized runtime environment. Again, the term "pushed" and its various forms, as used herein, refers to sending (e.g., transmitting) data to another program or computer (e.g., the computerized runtime environment) via network communications without the other program or computer having requested the data. Execution of the computerized specification object in the runtime environment may be initiated upon being received at the runtime environment, in accordance with one embodiment.

The analytical model is caused to be executed by the selected runtime environment in accordance with at least the instructions for mapping contained in the user-script data structure. The mapping instructions allow the runtime environment to properly read and execute the analytical model thereby making the analytical model compatible for execution in the runtime environment. Thus the computerized specification object functions as an interface that causes the analytical model to be compatible with the selected runtime environment even though the analytical model is defined in a format that is incompatible with the runtime environment. Upon executing the analytical model, the runtime environment generates results data.

At block 450, the results data, generated by the computerized runtime environment by executing the analytical model, are pulled from the computerized runtime environment. Again, the term "pulled" and its various forms, as used herein, refers to requesting data from another program or computer and receiving the data via network communications. In one embodiment, the results data is pulled from the runtime environment to the analytical application environment based on the post-script data structure upon completion of the execution of the analytical model by the runtime environment.

With the present computerized method 400, by selecting a new runtime environment via the user interface (which changes the meta-information), an analytical model can be executed by a selected runtime environment without being reprogrammed/rewritten in a format compatible with the selected runtime environment. The user-script data structure is re-generated based on the runtime specification of the newly selected runtime environment to re-map the analytical expressions of the analytical model to executable expressions of the newly selected runtime environment. The analytical model along with the user-script data structure is then transmitted to the new runtime environment for execution.

Furthermore, in one embodiment, a computerized configuration object may be pushed over the computer network to the computerized runtime environment. The computerized configuration object is used to synchronize with system elements of the computerized runtime environment and to specify where the analytical model is to be executed in the computerized runtime environment.

In one embodiment, access to a configuration file by the computerized runtime environment is provided. The configuration file specifies where (e.g., hardware-wise) the analytical model is to be executed in the computerized runtime environment. For example, the configuration file may specify that the analytical model is to be executed on local nodes, remote nodes, clustered nodes, or a combination thereof, in the runtime environment.

In one embodiment, a computerized initiation object may be pushed over the computer network to the computerized runtime environment. The computerized initiation object specifies multiple data structures, storing input data for the analytical model, to be accessed by the computerized runtime environment.

In this manner, a user (e.g., a business analyst) can generate an analytical model that can be executed in any quantitative analysis provider runtime environment. A computerized specification object can be generated that has a standardized format. The standardized format includes at least a pre-script data structure, a user-script data structure, and a post-script data structure. The user-script data structure specifies the analytical model and maps analytical expressions of the analytical model to executable expressions of a selected runtime environment upon execution of the user-script data structure.

Cloud or Enterprise Embodiments

In one embodiment, the present system is a computing/data processing system including an executable application or collection of distributed applications in an enterprise. The present analytical application infrastructure (AAI) is an implemented component/program module of the application. The application and computing system may be configured to operate with or be implemented as a cloud-based networking system, a software-as-a-service (SaaS) architecture, or other type of networked computing solution. In one embodiment the present system is a centralized server-side application that provides at least the functions disclosed herein and that is accessed by many users via computing devices/terminals communicating with the computing system (functioning as the server) over a computer network.

In one embodiment, one or more of the components described herein (including the AAI) are configured as program modules stored in a non-transitory computer readable medium. The program modules are configured with stored instructions that when executed by at least a processor cause the computing device to perform the corresponding function(s) as described herein.

Computing Device Embodiment

Figure 5:
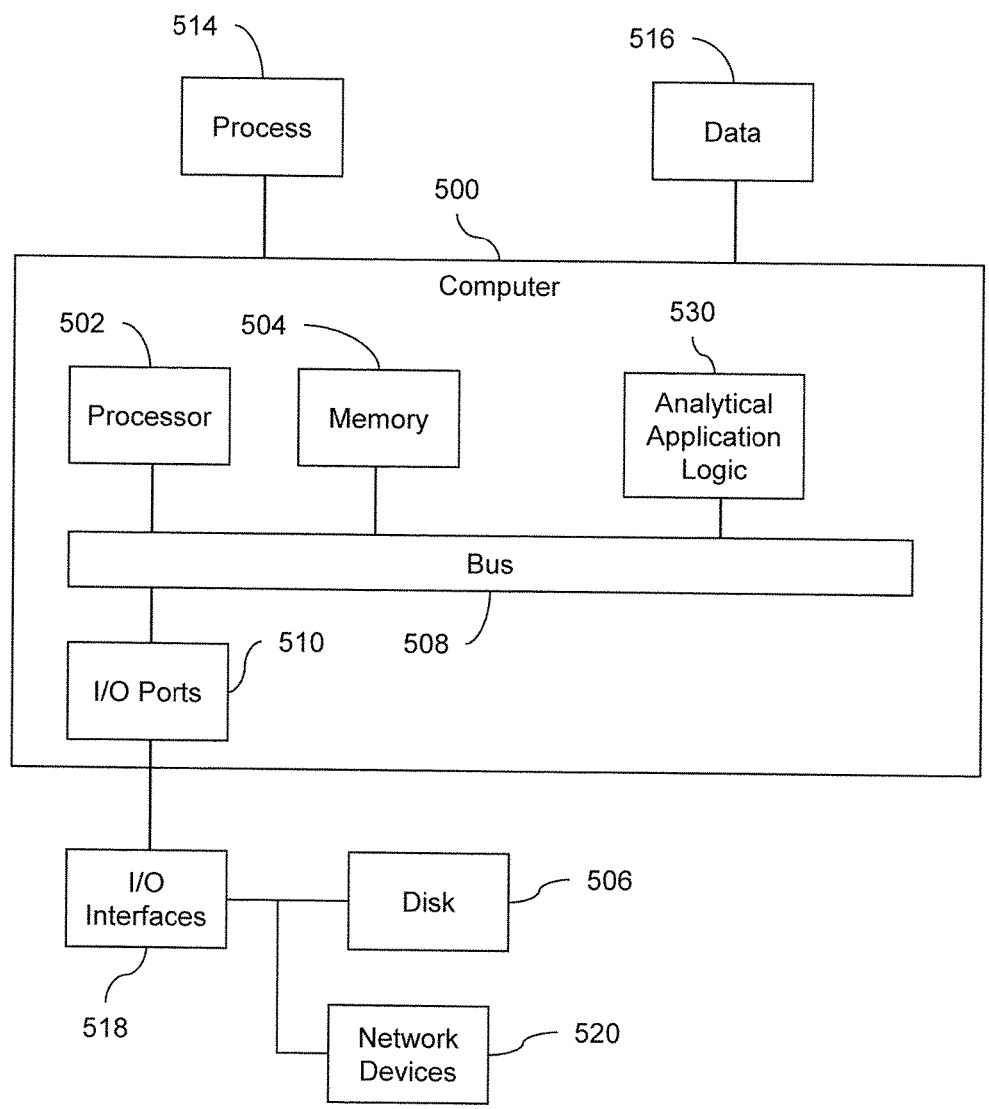
FIG. 5 illustrates an example computing device that is configured and/or programmed with one or more of the example systems and methods described herein, and/or equivalents.

FIG. 5 illustrates an example computing device that is configured and/or programmed with one or more of the example systems and methods described herein, and/or equivalents. The example computing device may be a computer 500 that includes a processor 502, a memory 504, and input/output ports 510 operably connected by a bus 508. In one example, the computer 500 includes analytical application logic 530, similar to analytical application logic 110 in FIG. 1, configured to facilitate the functions of the AAI as previously described. In different examples, the logic 530 may be implemented in hardware, a non-transitory computer-readable medium with stored instructions, firmware, and/or combinations thereof. While the logic 530 is illustrated as a component attached to the bus 508, it is to be appreciated that in other embodiments, the logic 530 could be implemented in the processor 502, stored in memory 504, or stored in disk 506.

In one embodiment, logic 530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may also be implemented as stored computer executable instructions that are presented to computer 500 as data 516 that are temporarily stored in memory 504 and then executed by processor 502.

Logic 530 may also provide means (e.g., hardware, non-transitory computer-readable medium that stores executable instructions, firmware) for performing the functions of the analytical application infrastructure (AAI).

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output (I/O) interface (e.g., card, device) 518 and an input/output port 510. The disk 506 may be, for example, a magnetic disk drive, a solid state disk drive, a floppy disk drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The computer 500 may interact with input/output (I/O) devices via the I/O interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the I/O interfaces 518, and/or the I/O ports 510. Through the network devices 520, the computer 500 may interact with a network. Through the network, the computer 500 may be logically connected to remote computers. Networks with which the computer 500 may interact include, but are not limited to, a LAN, a WAN, and other networks.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. §101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computing device where the computing device includes at least a processor for executing instructions from a memory, the method comprising:
    identifying a selected runtime environment to execute an analytical model that includes analytical expressions;
    generating a user-script data structure, wherein the user-script data structure includes instructions for mapping the analytical expressions of the analytical model to executable expressions of the selected runtime environment based on a runtime specification of the selected runtime environment;
    generating a computerized specification object, wherein the computerized specification object includes:
        (i) a pre-script data structure specifying how the selected runtime environment is to access input data to be operated upon by the analytical model,
        (ii) the user-script data structure and the analytical model, and
        (iii) a post-script data structure specifying how to output results data produced by the analytical model from the selected runtime environment;
    transmitting the computerized specification object over a computer network to the selected runtime environment for execution of the analytical model by the selected runtime environment, wherein access is provided to a configuration file specifying a designation of a hardware execution configuration of selected nodes that are to be instructed to execute the analytical model, wherein the selected nodes are selected from a plurality of available nodes of the selected runtime environment; and
    receiving results data from the selected runtime environment.

2. The method of claim 1, further comprising transmitting a computerized configuration object over the computer network to the selected runtime environment to synchronize with the selected runtime environment based on a set of parameters, and to specify where the analytical model is to be executed in the selected runtime environment.

3. The method of claim 1, further comprising initiating execution of the computerized specification object in the selected runtime environment.

4. The method of claim 1, wherein the executable expressions include a plurality of computational steps to be executed in sequence by the selected runtime environment.

5. The method of claim 1, wherein the pre-script data structure is generated to specify how the selected runtime environment is to connect to a database device to access the input data to be operated upon by the analytical model.

6. The method of claim 1, wherein the pre-script data structure is generated to specify how the input data to be operated upon by the analytical model is to be read by the selected runtime environment from a data file.

7. The method of claim 1, wherein the configuration file specifies whether the analytical model is to be executed on local nodes, remote nodes, clustered nodes, or a combination of the local nodes, the remote nodes, and the clustered nodes of the selected runtime environment.

8. The method of claim 1, further comprising transmitting a computerized initiation object over the computer network to the selected runtime environment, wherein the computerized initiation object specifies a plurality of data structures, storing the input data for the analytical model, to be accessed by the selected runtime environment.

9. The method of claim 1, wherein the user-script data structure is generated to specify a sequence of analytical steps of the analytical model to be performed by the selected runtime environment on the input data.

10. A computing system, comprising:
    a processor connected to memory;
    analytical application logic stored on a non-transitory computer readable medium and configured with instructions that when executed by the processor cause the processor to:
        generate a computerized specification object having:
            a user-script data structure specifying an analytical model having analytical expressions, wherein the user-script data structure includes instructions for mapping the analytical expressions to executable expressions of a computerized runtime environment;
            a pre-script data structure specifying how the computerized runtime environment is to access independent variable data to be operated upon by the analytical model, and
            a post-script data structure specifying how to output results data produced by the analytical model when executed by the computerized runtime environment; and provide access to a configuration file specifying a designation of a hardware execution configuration of selected nodes that are to be instructed to execute the analytical model, wherein the selected nodes are selected from a plurality of available nodes of the computerized runtime environment; and user interface logic stored on the non-transitory computer readable medium and configured with instructions that when executed by the processor cause the processor to facilitate user interaction with the analytical application logic for generating the computerized specification object.

11. The computing system of claim 10, wherein the analytical model specifies a plurality of computational steps, as the analytical expressions, to be executed in sequence by the computerized runtime environment.

12. The computing system of claim 10, wherein the analytical model specifies a plurality of statistical operations, as the analytical expressions, to be executed in sequence by the computerized runtime environment.

13. The computing system of claim 10, further comprising a database device configured to store the independent variable data and the results data, wherein the database device is accessible by the computerized runtime environment.

14. The computing system of claim 13, wherein the pre-script data structure specifies how the computerized runtime environment is to connect to the database device to access the independent variable data.

15. The computing system of claim 13, wherein the post-script data structure specifies how the computerized runtime environment is to connect to the database device to store the results data.

16. A non-transitory computer-readable medium storing computer-executable instructions that, when executed by a computer, cause the computer to perform functions, wherein the instructions comprise:

instructions for identifying a runtime environment for executing an analytical model;

pre-script instructions for directing the runtime environment, while executing the analytical model, to operably connect to a database device of an analytical application infrastructure and map a plurality of data structures to variables to be communicated between the runtime environment and the analytical application infrastructure;

user-script instructions for mapping executable runtime environment expressions to analytical expressions of the analytical model to be executed by the runtime environment;

post-script instructions for directing the runtime environment to store output results, resulting from execution of the analytical model by the runtime environment, to an output data structure of the plurality of data structures and configuration instructions to providing access to a configuration file specifying a designation of a hardware execution configuration of selected nodes that are to be instructed to execute the analytical model, wherein the selected nodes are selected from a plurality of available nodes of the runtime environment.

17. The non-transitory computer-readable medium of claim 16, wherein the configuration file specifies whether the analytical model is to be executed on local nodes, remote nodes, clustered nodes, or a combination of the local nodes, the remote nodes, and the clustered nodes of the selected runtime environment.

18. The non-transitory computer-readable medium of claim 16, wherein the instructions further include instructions for synchronizing with the runtime environment based on a set of parameters.

19. The non-transitory computer-readable medium of claim 16, wherein the instructions further include instructions for specifying where the analytical model is to be executed in the runtime environment.

20. The non-transitory computer-readable medium of claim 16, wherein the instructions further include instructions for specifying independent variable data, in at least one data structure of the plurality of data structures, to be accessed by the runtime environment and operated upon by the analytical model.

* * * * *